(12) United States Patent
Ido

(10) Patent No.: US 8,379,279 B2
(45) Date of Patent: Feb. 19, 2013

(54) COLOR IMAGE FORMING APPARATUS AND COLOR IMAGE FORMING METHOD FOR CORRECTING SCAN-LINE POSITION ERROR WITH INTERPOLATION

(75) Inventor: Yoko Ido, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 12/179,165

(22) Filed: Jul. 24, 2008

(65) Prior Publication Data

US 2009/0034034 A1   Feb. 5, 2009

(30) Foreign Application Priority Data

Jul. 31, 2007 (JP) ................................ 2007-199897

(51) Int. Cl.
*H04N 1/46* (2006.01)
*G06K 9/36* (2006.01)
*G03G 15/01* (2006.01)

(52) U.S. Cl. ........ 358/525; 358/1.9; 358/3.26; 358/505; 358/538; 358/448; 358/474; 382/167; 382/260; 382/284; 399/184; 399/301; 347/15; 347/116; 347/235

(58) Field of Classification Search .................. None
See application file for complete search history.

(56) References Cited

U.S. PATENT DOCUMENTS

| | | | | |
|---|---|---|---|---|
| 5,235,436 A * | 8/1993 | Sakamoto et al. | ............ | 358/462 |
| 5,438,431 A | 8/1995 | Ostromoukhov | ............ | 358/457 |
| 5,815,605 A * | 9/1998 | Koike | ............ | 382/269 |
| 6,118,463 A * | 9/2000 | Houki et al. | ............ | 347/116 |
| 6,134,022 A | 10/2000 | Yamamoto et al. | ............ | 358/1.9 |
| 6,236,827 B1 | 5/2001 | Hada | ............ | 399/301 |
| 6,487,309 B1 * | 11/2002 | Chen | ............ | 382/162 |
| 6,731,400 B1 | 5/2004 | Nakamura et al. | ............ | 358/1.9 |
| 6,963,423 B2 | 11/2005 | Ogasahara et al. | ............ | 358/1.8 |
| 7,286,717 B2 | 10/2007 | Nomizu | ............ | 382/280 |
| 7,684,079 B2 | 3/2010 | Takata et al. | ............ | 358/1.9 |
| 7,692,832 B2 * | 4/2010 | Klassen | ............ | 358/518 |
| 2003/0206308 A1 | 11/2003 | Matsuya | ............ | 358/1.9 |
| 2005/0220523 A1 | 10/2005 | Fujimori | ............ | 400/76 |

(Continued)

FOREIGN PATENT DOCUMENTS

| | | |
|---|---|---|
| JP | 1-227576 | 9/1989 |
| JP | 10-324027 | 12/1998 |
| JP | 2002-116394 | 4/2002 |
| JP | 2003-241131 | 8/2003 |
| JP | 2004-170755 | 6/2004 |
| JP | 2006-248096 | 9/2006 |
| JP | 2007-136825 | 6/2007 |

*Primary Examiner* — Steven Kau

(74) *Attorney, Agent, or Firm* — Fitzpatrick, Cella, Harper & Scinto

(57) ABSTRACT

According to this invention, the image attribute is determined by determining whether the image of each color component of color image data having undergone a screen process is a continuous tone image, and whether the image of each color component is a pattern image. Whether to perform an interpolation process is determined for each color component based on the attribute determination result of each color component. If it is determined that the images of all the color components are pattern images, interpolation determination results do not coincide with each other, and there is a color component determined to represent a continuous tone image, the interpolation determination result of this color component is overwritten with the interpolation determination result of the remaining color components. The interpolation process is executed in accordance with the interpolation determination result.

10 Claims, 16 Drawing Sheets

U.S. PATENT DOCUMENTS

| | | | |
|---|---|---|---|
| 2006/0119895 A1* | 6/2006 | Takata et al. | 358/3.26 |
| 2006/0226338 A1 | 10/2006 | Tojima et al. | 250/208.1 |
| 2006/0232620 A1 | 10/2006 | Kitamura et al. | 347/15 |
| 2007/0103728 A1 | 5/2007 | Otani | 358/1.18 |
| 2008/0246984 A1 | 10/2008 | Shoji | 358/1.13 |
| 2009/0034004 A1 | 2/2009 | Nakamura | 358/3.03 |
| 2009/0034007 A1 | 2/2009 | Sano et al. | 358/3.13 |
| 2009/0034029 A1 | 2/2009 | Nakamura | 358/505 |

* cited by examiner

INCLINATION SHIFT AMOUNT

BITMAP IMAGE
(BEFORE TONE CORRECTION)

CORRECTED BITMAP IMAGE

BITMAP IMAGE
(AFTER TONE CORRECTION)

EXPOSURE IMAGE

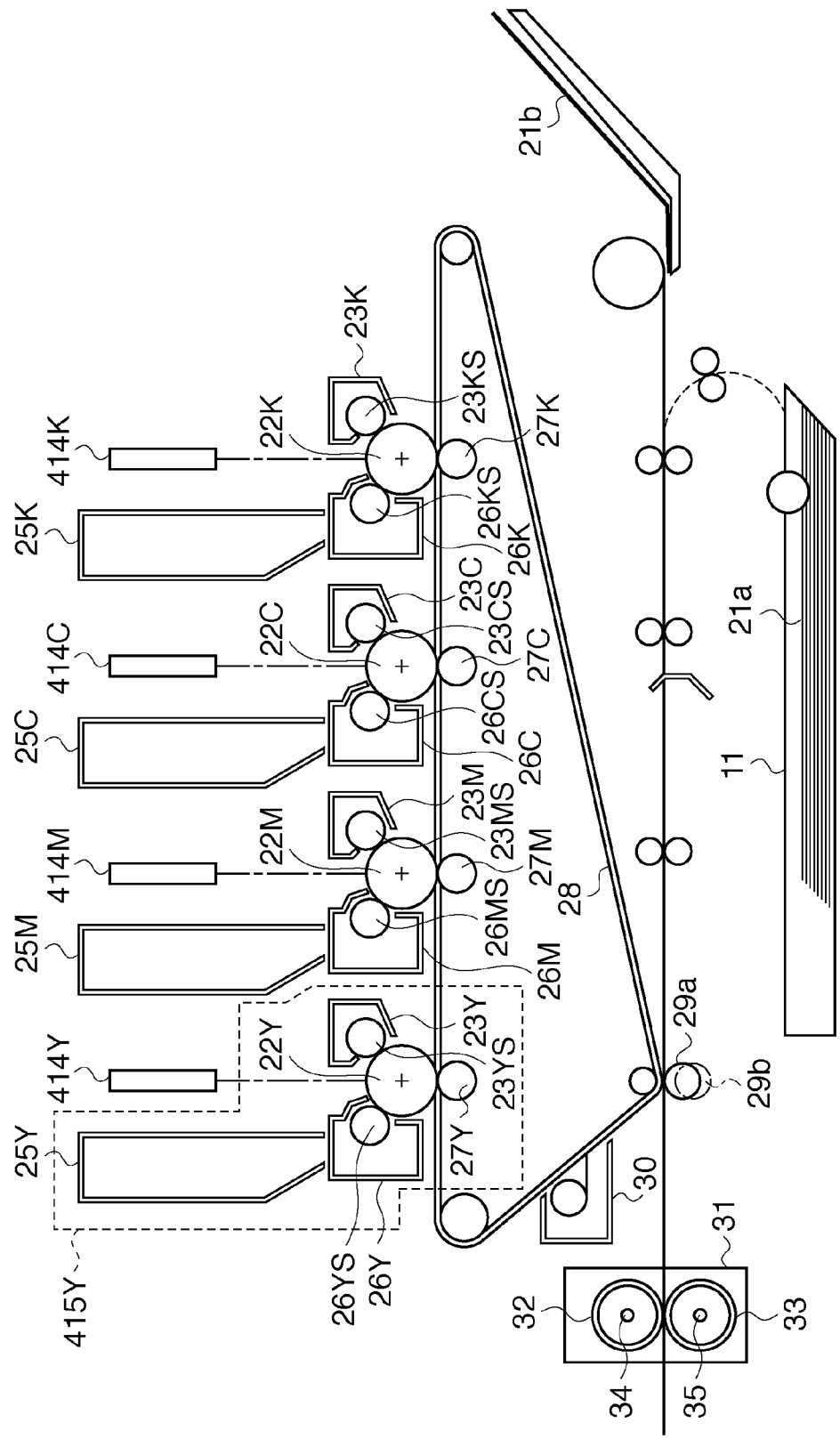

F I G. 5E
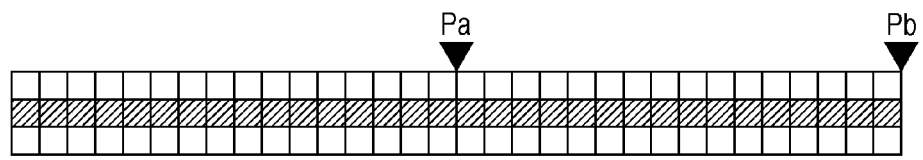
F I G. 5F
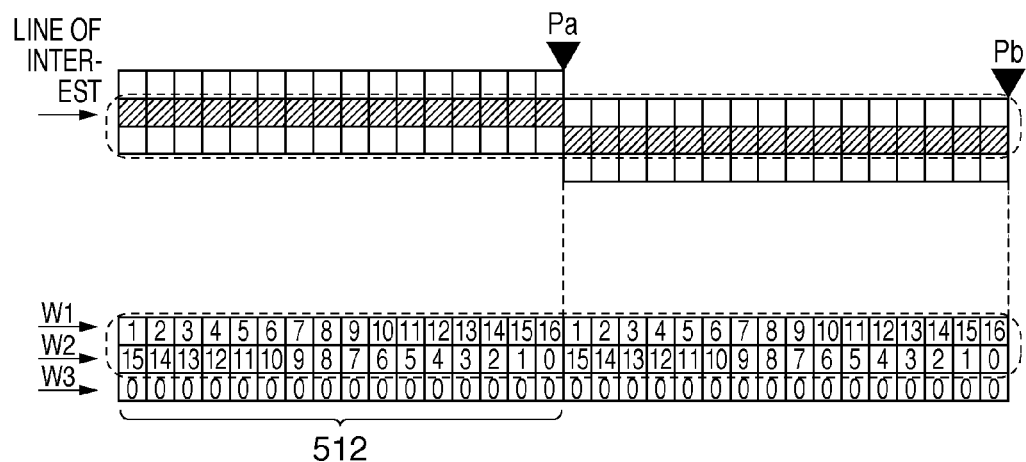
F I G. 5G
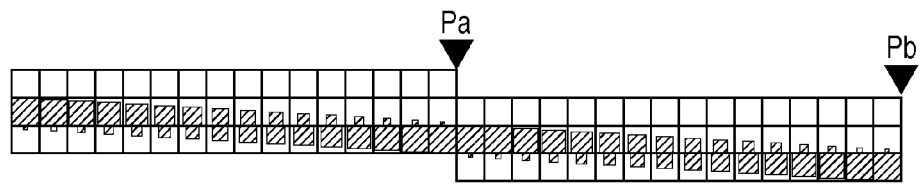

SCAN LINE CHANGING POINT 408

701

SCAN LINE CHANGING POINT

SCAN LINE CHANGING POINT

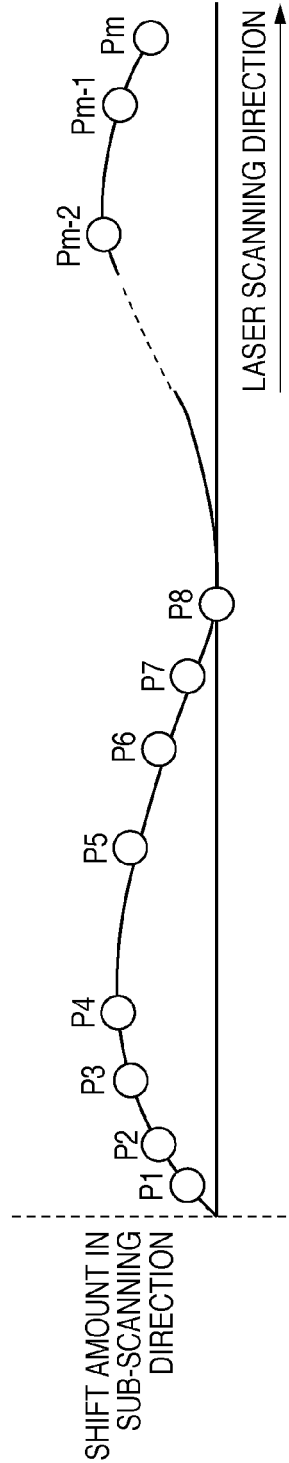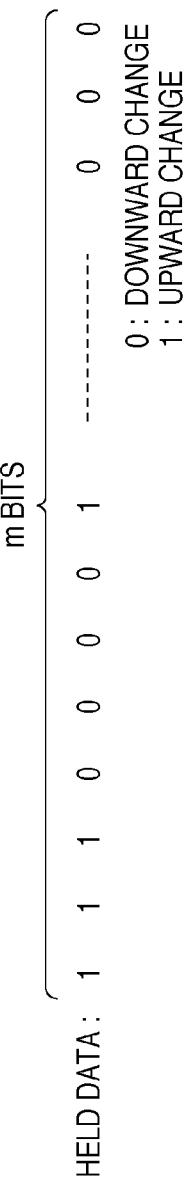

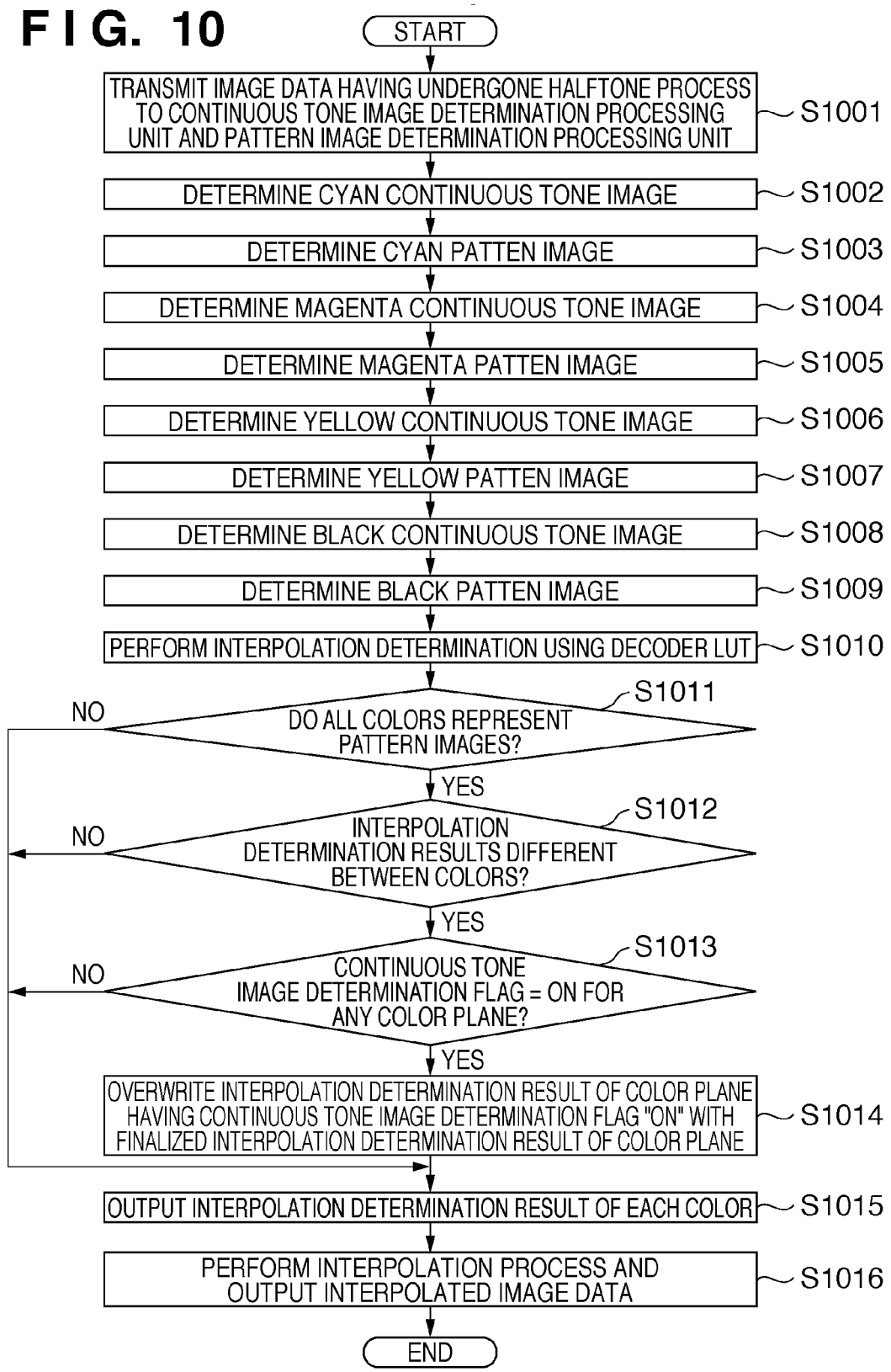

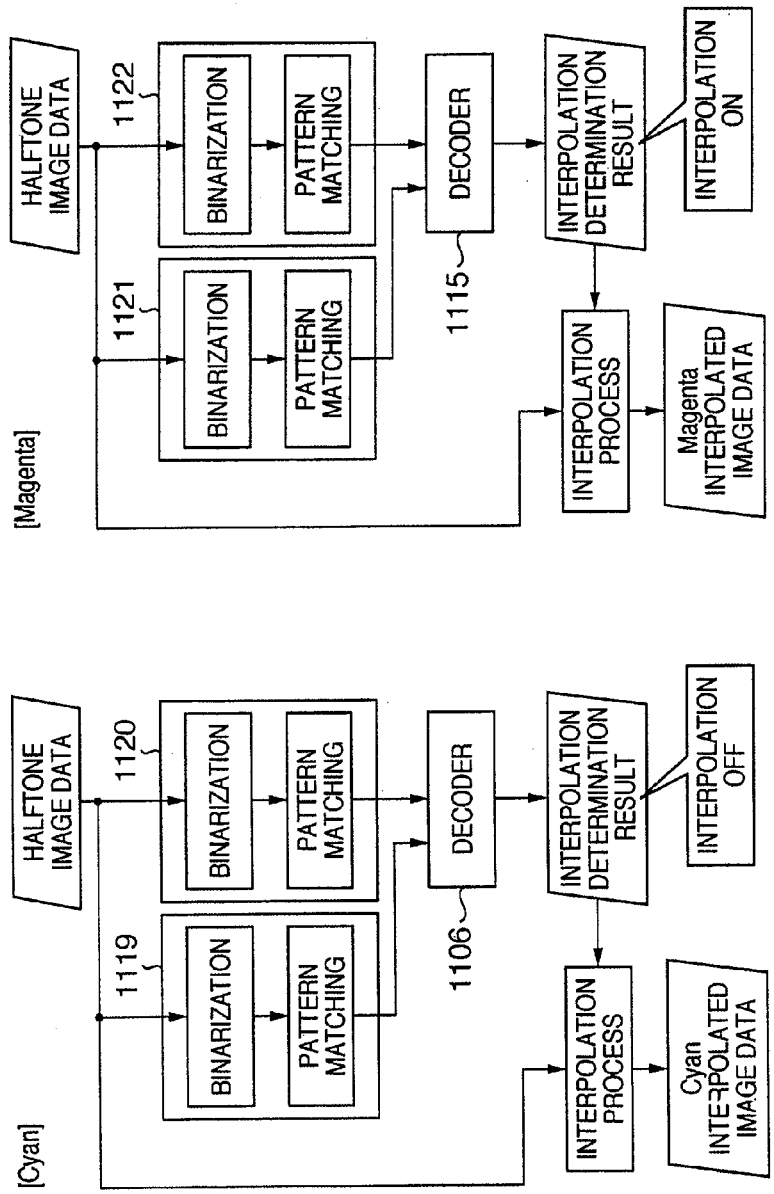

FIG. 13

| RESULT NO. | CONTINUOUS TONE IMAGE DETERMINATION FLAG | PATTERN IMAGE DETERMINATION FLAG | INTERPOLATION DETERMINATION |
|---|---|---|---|
| 1 | OFF | OFF | ON |
| 2 | OFF | ON | ON |
| 3 | ON | OFF | OFF |
| 4 | ON | ON | OFF |

FIG. 14

| | C | M | Y | K |
|---|---|---|---|---|
| CONTINUOUS TONE IMAGE | ON | OFF | OFF | OFF |
| PATTERN IMAGE | ON | ON | ON | ON |
| INTERPOLATION DETERMINATION | OFF | ON | ON | ON |

FIG. 16A

DIRECTION: UPWARD SHIFT

NUMBER OF PIXELS TO BE INTERPOLATED : 16

| W1 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|
| W2 | 33 | 31 | 29 | 27 | 25 | 23 | 21 | 19 | 17 | 15 | 13 | 11 | 9 | 7 | 5 | 3 |
| W3 | 3 | 5 | 7 | 9 | 11 | 13 | 15 | 17 | 19 | 21 | 23 | 25 | 27 | 29 | 31 | 33 |

FIG. 16B

NUMBER OF PIXELS TO BE INTERPOLATED : 16

| W1 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|
| W2 | 9 | 9 | 8 | 8 | 7 | 7 | 6 | 5 | 5 | 4 | 3 | 3 | 2 | 2 | 1 | 1 |
| W3 | 1 | 1 | 2 | 2 | 3 | 3 | 4 | 5 | 5 | 6 | 7 | 7 | 8 | 8 | 9 | 9 |

FIG. 16C

DIRECTION: DOWNWARD SHIFT

NUMBER OF PIXELS TO BE INTERPOLATED : 16

| W1 | 3 | 5 | 7 | 9 | 11 | 13 | 15 | 17 | 19 | 21 | 23 | 25 | 27 | 29 | 31 | 33 |
|---|---|---|---|---|---|---|---|---|---|---|---|---|---|---|---|---|
| W2 | 33 | 31 | 29 | 27 | 25 | 23 | 21 | 19 | 17 | 15 | 13 | 11 | 9 | 7 | 5 | 3 |
| W3 | 0 | 0 | 0 | 0 | 0 | 0 | 0 | 0 | 0 | 0 | 0 | 0 | 0 | 0 | 0 | 0 |

FIG. 16D

NUMBER OF PIXELS TO BE INTERPOLATED : 16

| W1 | 1 | 1 | 2 | 2 | 3 | 3 | 4 | 5 | 5 | 6 | 7 | 7 | 8 | 8 | 9 | 9 |
|---|---|---|---|---|---|---|---|---|---|---|---|---|---|---|---|---|
| W2 | 9 | 9 | 8 | 8 | 7 | 7 | 6 | 5 | 5 | 4 | 3 | 3 | 2 | 2 | 1 | 1 |
| W3 | 0 | 0 | 0 | 0 | 0 | 0 | 0 | 9 | 0 | 0 | 0 | 0 | 0 | 0 | 0 | 0 |

COLOR IMAGE FORMING APPARATUS AND COLOR IMAGE FORMING METHOD FOR CORRECTING SCAN-LINE POSITION ERROR WITH INTERPOLATION

BACKGROUND OF THE INVENTION

1. Field of the Invention

The present invention relates to a color image forming apparatus and color image forming method and, more particularly, to a tandem type electrophotographic color image forming apparatus having independent image forming units for respective color components, and a color image forming method.

2. Description of the Related Art

As a kind of color image forming apparatus such as a printer or copying machine, there is known a tandem type color image forming apparatus which comprises electrophotographic image forming units equal in number to color components and sequentially transfers toner images of respective color components onto a print medium by the image forming units. The image forming unit of each color includes a developing unit and photosensitive drum. It is known that the tandem type color image forming apparatus has a plurality of factors which cause a positional error (to be referred to as a registration error) between images of respective color components.

These factors include the unevenness and attaching positional error of the lens of a deflecting scanning unit including the optical system of a polygon mirror, fθ lens, and the like, and the mounting positional error of the deflecting scanning unit to the image forming apparatus main body. Owing to these positional errors, the scan line does not become a straight line parallel to the rotating shaft of the photosensitive drum, and inclines or skews. If the degree of inclination or skew of the scan line (to be referred to as the profile or shape of the scan line hereinafter) is different between colors, a registration error occurs.

The profile has different characteristics for respective image forming apparatuses, that is, printing engines, and for deflecting scanning units of respective colors. FIGS. 6A to 6D show examples of the profile. In FIGS. 6A to 6D, the abscissa axis represents a position in the main scanning direction in the image forming apparatus. A line 600 expressed as a straight line in the main scanning direction represents the characteristic (profile) of an ideal scan line free from a skew. Curves 601, 602, 603, and 604 represent the profiles of respective colors, and show examples of the profiles of scan lines for cyan (to be referred to as C hereafter), magenta (to be referred to as M hereafter), yellow (to be referred to as Y hereafter), and black (to be referred to as K hereafter), respectively. The ordinate axis represents a shift amount in the sub-scanning direction from an ideal characteristic. As is apparent from FIGS. 6A to 6D, the curve of the profile is different between colors. When electrostatic latent images are formed on the photosensitive drums of image forming units corresponding to the respective colors, the profile difference appears as the registration error between image data of the respective colors.

As a measure against the registration error, Japanese Patent Laid-Open No. 2002-116394 discloses a method of measuring the degree of skew of a scan line using an optical sensor in the process of assembling a deflecting scanning device, mechanically rotating the lens to adjust the skew of the scan line, and fixing the lens with an adhesive.

Japanese Patent Laid-Open No. 2003-241131 discloses a method of measuring the inclination of a scan line using an optical sensor in the process of mounting a deflecting scanning device into a color image forming apparatus main body, mechanically tilting the deflecting scanning device to adjust the inclination of the scan line, and then mounting the deflecting scanning device into the color image forming apparatus main body.

Japanese Patent Laid-Open No. 2004-170755 discloses a method of measuring the inclination and skew of a scan line using an optical sensor, correcting bitmap image data to cancel them, and forming the corrected image. That is, a shift of an actual scan line from an ideal scan line which is a straight line parallel on the surface of the photosensitive drum to the rotating shaft of the photosensitive drum is canceled by shifting image data by the same amount in an opposite direction. This method corrects image data, and thus does not require a mechanical adjustment member or adjustment step in assembly. This method can downsize a color image forming apparatus, and deal with a registration error at a lower cost than those by methods disclosed in Japanese Patent Laid-Open Nos. 2002-116394 and 2003-241131. The electrical registration error correction is divided into correction of one pixel and that of less than one pixel. In correction of one pixel, pixels are shifted (offset) one by one in the sub-scanning direction in accordance with the inclination and skew correction amounts, as shown in FIGS. 15A to 15C. In the following description, a position where the pixel is offset will be called a scan line changing point, and the process to offset a pixel will be called a scan line changing process. In FIGS. 15A to 15C, P1 to P5 are scan line changing points.

In FIG. 15A, a profile 1501 of a scan line is corrected. The profile 1501 may also be expressed by an array of the coordinate values of pixels on a scan line, but in FIG. 15A, is expressed by approximate straight lines divided for respective areas. The scan line changing point is a position in the main scanning direction where the profile is scanned in the main scanning direction and shifts by one pixel in the sub-scanning direction. In FIG. 15A, P1 to P5 are scan line changing points. At a scan line changing point serving as a boundary, dots after the scan line changing point are shifted by one line in a direction opposite to the shift of the profile in the sub-scanning direction. This process is executed by paying attention to each line. FIG. 15B shows an example of image data shifted in the sub-scanning direction at each scan line changing point. In FIG. 15B, each hatched portion 1511 is one line before the scan line changing process, that is, one line in original image data. As a result of the scan line changing process, each line shifts in a direction in which the shift of the profile in the sub-scanning direction is canceled. FIG. 15C shows an example of image data obtained in this manner. Each hatched portion is one line before correction. In image formation, corrected image data is formed for each line. For example, normal image formation proceeds in the order of a line 1521, line 1522, . . . . After image formation, a hatched portion which forms one line in image data before correction is formed on an ideal scan line which should be originally formed. However, the scan line changing process is done for each pixel, so a shift of less than one pixel still remains in the sub-scanning direction.

A shift of less than one pixel that cannot be completely corrected by the scan line changing process is corrected by adjusting the tone value of bitmap image data by preceding and succeeding pixels in the sub-scanning direction. More specifically, when the characteristic of the profile represents an upward inclination in the scanning direction, bitmap image data before tone correction is corrected to a pixel array inclined in a direction (downward in this example) opposite to the inclination of the profile. In order to make image data close to ideal image data after correction, tone correction is executed near a scan line changing point to smooth a step at the scan line changing point. The smoothing can be achieved using the width and intensity of a laser pulse. Tone correction performed for smoothing after the scan line changing process will be called an interpolation process.

Depending on the properties of an image, there are image data which preferably undergoes the interpolation process, and image data whose image quality is degraded by the interpolation process. For example, a repetitive pattern (to be referred to as a pattern image) with the same design, a character, a thin line, and the like which can be rendered by office document creation software can be smoothed by the interpolation process, improving the visibility of information. To the contrary, if the interpolation process is performed near a scan line changing point for a continuous tone image having undergone a screen process, the density becomes uneven only near the scan line changing point, degrading the image quality. This is because, when a line growth screen is used, the interpolation process changes the thickness of a line of a screen at a scan line changing point, and the density macroscopically seems to change. If the interpolation process is done for an add-on image such as a copy forgery-inhibited pattern, the effect of the add-on image may be lost, so the interpolation process is not suitable.

Whether or not to apply the interpolation process needs to be determined in accordance with the attribute of target image data. For this purpose, there is proposed a method using continuous tone image determining units 1119 and 1121 and pattern image determining units 1120 and 1122 for respective color planes, as shown in FIGS. 11A and 11B. According to this method, decoders 1106 and 1115 combine the determination results of these units, finally deriving the interpolation determination result. The continuous tone image determining units 1119 and 1121 can determine an image for which interpolation is set off (no interpolation is executed). The pattern image determining units 1120 and 1122 can determine an image for which interpolation is set on (interpolation is executed).

When determining whether to apply the interpolation determination process, the determination result may become different between color planes. Assume that a pattern image which is formed in cyan (C), magenta (M), yellow (Y), and black (K) and matches a cyan screen pattern is input. Whether the input image is a continuous tone image is determined based on the fact that image data after the screen process contains a screen pattern. Since this pattern image has a pattern matching the cyan screen pattern, it is determined that this pattern image is a continuous tone image. At the same time, it is also determined that this input image is a pattern image having a pattern matching a predetermined pattern. It is desirable not to perform the interpolation process for a continuous tone image, and perform the interpolation process for a pattern image. If these determination results are derived, the determination result of whether or not to execute the interpolation process for this image data becomes ambiguous. Since the screen angle is generally different between colors, the input image does not match the color screen patterns of the remaining color planes, and it is determined that the input image is not a continuous tone image. Even with these remaining color planes, it is determined that the input image is a pattern image, and thus a definite determination result that interpolation is set ON can be obtained. Hence, the result of interpolation determination (called an interpolation determination result) becomes different between the cyan plane and the remaining color planes.

The pattern image should be formed with the color planes of color components used as long as it is reproduced in a combination color of color components. The interpolation determination result for a pattern image should be the same between all color planes. However, when the interpolation determination result of a given color plane becomes different from those of the remaining color planes, like the above-described example, the given color plane which forms one pattern undergoes the interpolation process, and the remaining color planes do not undergo it. A small difference between color planes may appear as an abnormal image such as a stripe or color moiré in the pattern image formed from a composition of the color planes.

SUMMARY OF THE INVENTION

The present invention has been made in consideration of the conventional situation, and has as its object to solve the above-described problems. More specifically, it is an object of the present invention to provide a color image forming apparatus and color image forming method for uniformly determining, for respective color planes, whether or not to perform the interpolation process for one image object when the image object is formed from a plurality of color planes.

To achieve the above object, the present invention comprises the following arrangement. That is, a color image forming apparatus which has, for each color component, an image forming unit for forming an image, and forms a color image by compositing images of respective color components, the apparatus comprises: a scan line changing processing unit configured to shift a position of each pixel in a sub-scanning direction for each color component of dot image data to be processed, so as to cancel a shift amount of a scan line in the sub-scanning direction on an image carrier of the image forming unit; a type determining unit configured to determine an image type for each color component of the image data to be processed; an interpolation determining unit configured to determine, based on the image type determined by the type determining unit for each color component, whether to perform an interpolation process to smooth a step of one pixel generated by shifting the dot image data by the scan line changing processing unit; and a changing unit configured to, when the image type is common to the respective color components and interpolation determination results are different between the respective color components, changing the interpolation determination results to make the interpolation determination results of all the color components coincide with each other.

According to the present invention, when one image object is formed from a plurality of color planes, whether or not to perform the interpolation process for the image object can be determined uniformly for respective color planes, preventing an image defect such as unevenness and color moiré.

Further features of the present invention will become apparent from the following description of exemplary embodiments with reference to the attached drawings.

BRIEF DESCRIPTION OF THE DRAWINGS

FIG. 2 is a sectional view showing the structure of a 4-drum color printer;

FIGS. 5A to 5G are views showing the skew characteristic of the image forming apparatus in the laser scanning direction, and a correction method;

FIGS. 9A to 9C are views showing the pixel position of a scan line changing point in the main scanning direction and the direction of change of the scan line to the next scan line changing point;

FIG. 10 is a flowchart showing a main process according to the first embodiment;

FIGS. 11A and 11B are block diagrams showing an example of a system which derives an interpolation determination result by a combination of attribute determination results;

FIG. 13 is a table showing an example of a decoder LUT;

FIG. 14 is a table showing an example of an attribute determination result and interpolation determination result for each color plane;

FIGS. 16A to 16D are views showing an example of the weighting arrangement.

DESCRIPTION OF THE EMBODIMENTS

[First Embodiment]

Figure 1A:
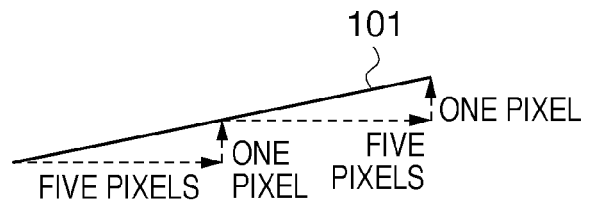
FIGS. 1A to 1E are views for explaining a correction method for less than one pixel.

The first embodiment of the present invention will be described with reference to the accompanying drawings. In the first embodiment, a shift of an actual scan line from an ideal scan line which should be originally formed by scanning the surface of a photosensitive drum with a laser beam, that is, from a scan line parallel to the rotating shaft of the photosensitive drum is canceled by shifting dot image data by the same amount in an opposite direction. If the image type (also called the image attribute) is the same between color planes in smoothing the step, whether or not to perform the smoothing process is uniformly determined for the respective color planes.

That is, the scan line changing process is performed to shift the position of each pixel in the sub-scanning direction for each color component of dot image data to be processed, so as to cancel the shift amount of a scan line in the sub-scanning direction on the image carrier of an image forming unit. Then, type determination is performed to determine the image type for each color component of the image data to be processed. More specifically, it is determined whether the target image is a continuous tone image or pattern image. As described in Description of the Related Art, the pattern image is an image containing a repetitive pattern. Based on the determined image type for each color component, it is determined whether or not to perform the interpolation process to smooth a step of one pixel generated by the scan line changing process. At this time, whether or not to perform the interpolation process is determined for each image type. If there is the first color component for which it is determined that the image is a pattern image and continuous tone image, and the determination result for the first color component is different from the determination result of whether or not to perform the interpolation process for the remaining color components, the determination result of whether or not to perform the interpolation process for the first color component is changed. In this manner, when the image type is the same between color components and the interpolation determination result is different between them, the determination result is changed to make the interpolation determination results for the respective color components coincide with each other.

An example of the structure of a laser beam printer as an example of an image forming apparatus applicable as an embodiment of the present invention, and an image correction method executed by the laser printer will be explained. The embodiment is applicable not only to the laser beam printer, but also to another type of output apparatus such as an inkjet printer or MFP (Multi Function Printer/Multi Function Peripheral). However, a printer to which the present invention can be effectively applied is one which comprises image forming units for respective color components and therefore may suffer a registration error between images of the respective color components. The registration error may occur when the inkjet printer is a serial printer in which printheads for respective color components are mounted in independent carriages, or a line head printer in which printheads for respective color components are independently attachable. By applying the embodiment of the present invention to these printers, the image quality improves. However, a tandem type color laser printer is highly likely to have a difference in scan line profile between color components, so the embodiment will exemplify the tandem type color laser printer.

<Image Forming Section of Tandem Color LBP>

Figure 4:
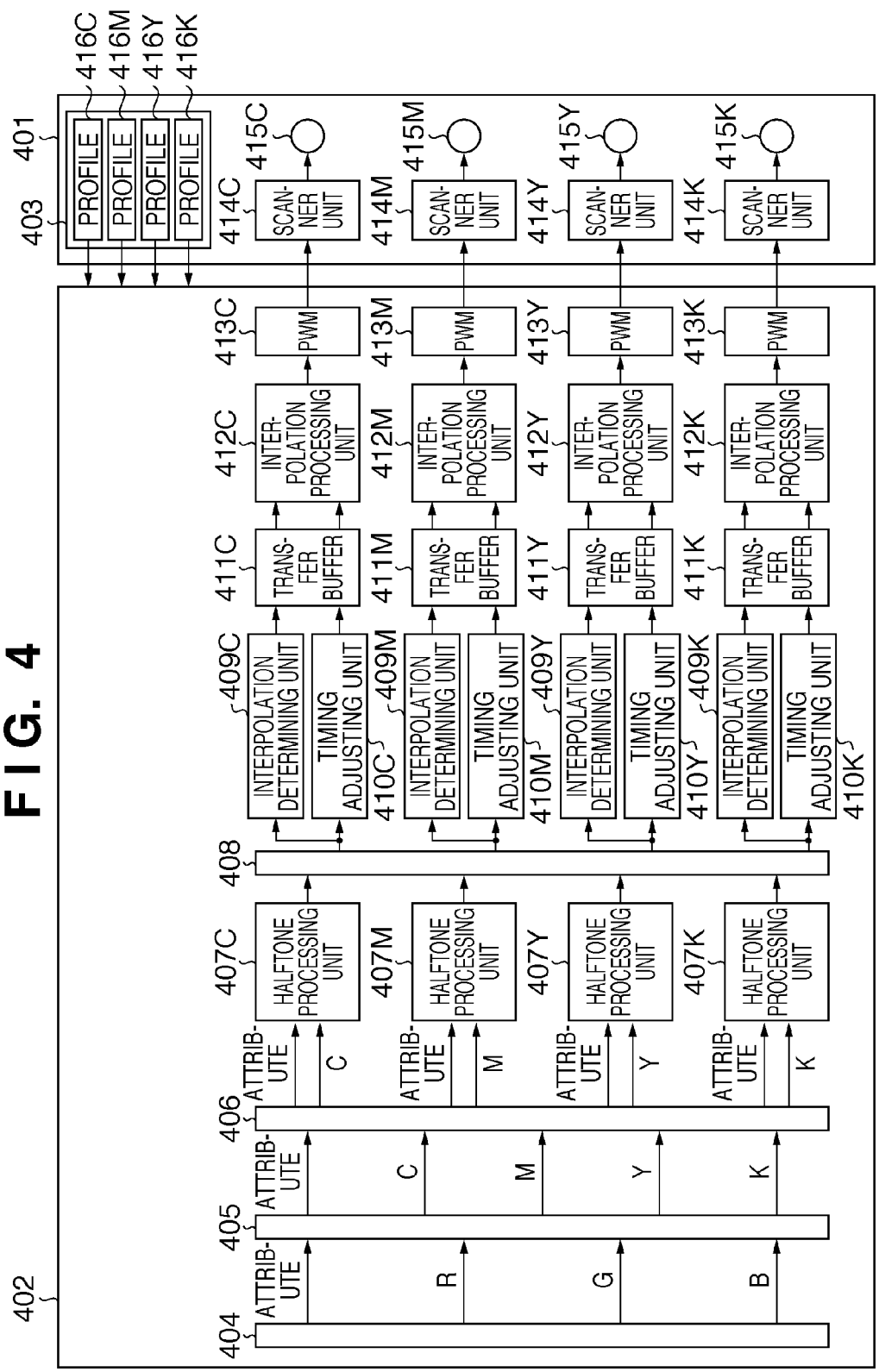
FIG. 4 is a block diagram showing blocks associated with formation of an electrostatic latent image in an electrophotographic color image forming apparatus according to the first embodiment.

FIG. 4 is a block diagram for explaining the arrangements of blocks associated with formation of an electrostatic latent image in an electrophotographic color image forming apparatus according to the first embodiment. The color image forming apparatus comprises a color image forming section 401 and image processing section 402. The image processing section 402 generates bitmap image information, and the color image forming section 401 forms an image on a print medium based on the bitmap image information. The image processing section 402 also performs a correction process such as registration error correction by referring to pieces of profile information 416C, 416M, 416Y, and 416K which are measured in advance and stored in a profile storage unit 403 for image forming units of respective color components. In the following description, building components denoted by reference numerals with color symbols "C", "M", "Y", and "K" for respective color components are sometimes generically named by reference numerals without these color symbols. The image forming unit is the name of a unit which includes a scanner unit 414 and printing unit 415 and forms a single-color image for each color component. The printing unit 415 is a unit which includes a photosensitive drum, transfer drum, and the like and forms a toner image. The printing unit 415 also forms images in addition to characters.

FIG. 2 is a sectional view of the tandem type color image forming section 401 adopting an intermediate transfer member 28 as an example of the electrophotographic color image forming apparatus. The operation of the color image forming section 401 in the electrophotographic color image forming apparatus will be explained with reference to FIG. 2. The color image forming section 401 drives exposure light in accordance with an exposure time processed by the image processing section 402, forming an electrostatic latent image on the photosensitive drum, that is, image carrier. The color image forming section 401 develops the electrostatic latent image to form a single-color toner image of each color component. The color image forming section 401 composites single-color toner images on the intermediate transfer member 28 to form a multi-color toner image. The color image forming section 401 transfers the multi-color toner image to a print medium 11, and thermally fixes it. The intermediate transfer member also serves as an image carrier. The charging means comprises four injection chargers 23Y, 23M, 23C, and 23K for charging photosensitive bodies 22Y, 22M, 22C, and 22K for Y, M, C, and K. The injection chargers incorporate sleeves 23YS, 23MS, 23CS, and 23KS.

Driving motors rotate the image carriers, that is, photosensitive bodies (photosensitive drums) 22Y, 22M, 22C, and 22K counterclockwise in accordance with the image forming operation. The scanner units 414Y, 414M, 414C, and 414K serving as exposure means irradiate the photosensitive bodies 22Y, 22M, 22C, and 22K with exposure light, selectively exposing the surfaces of the photosensitive bodies 22Y, 22M, 22C, and 22K. As a result, electrostatic latent images are formed on the surfaces of the photosensitive bodies. Developing units 26Y, 26M, 26C, and 26K serving as developing means develop the electrostatic latent images with Y, M, C, and K toners supplied by toner cartridge 25Y, 25M, 25C and 25K in order to visualize the electrostatic latent images. The developing units incorporate sleeves 26YS, 26MS, 26CS, and 26KS. Each developing unit 26 is detachable. Each scanner unit can express the tone of each pixel, e.g., 16 tone levels in accordance with the width and intensity of a laser beam.

Primary transfer rollers 27Y, 27M, 27C, and 27K serving as transfer means press the intermediate transfer member 28 rotating clockwise against the photosensitive bodies 22Y, 22M, 22C, and 22K, transferring the toner images on the photosensitive bodies to the intermediate transfer member 28. A single-color toner image is efficiently transferred onto the intermediate transfer member 28 by applying a proper bias voltage to the primary transfer roller 27, and making the rotational speed of the photosensitive body 22 different from that of the intermediate transfer member 28. This transfer is called primary transfer.

A multi-color toner image obtained by compositing single-color toner images of stations (which mean the image forming units of the respective color components) is conveyed to a secondary transfer roller 29 as the intermediate transfer member 28 rotates. The multi-color toner image on the intermediate transfer member 28 is transferred onto the print medium 11 which is conveyed from a paper feed tray 21a or 21b to the secondary transfer roller 29 while being clamped. A proper bias voltage is applied to the secondary transfer roller 29 to electrostatically transfer the toner image. This transfer is called secondary transfer. While transferring the multi-color toner image onto the print medium 11, the secondary transfer roller 29 abuts against the print medium 11 at a position 29a, and moves apart from the print medium 11 to a position 29b after printing.

A fixing unit 31 comprises a fixing roller 32 for heating the print medium 11, and a press roller 33 for pressing the print medium 11 against the fixing roller 32, in order to fuse and fix, on the print medium 11, a multi-color toner image transferred on the print medium 11. The fixing roller 32 and press roller 33 are hollow and incorporate heaters 34 and 35, respectively. The fixing unit 31 conveys the print medium 11 bearing the multi-color toner image by the fixing roller 32 and press roller 33, and applies heat and a pressure to fix the toner to the print medium 11.

The toner-fixed print medium 11 is discharged by discharge rollers (not shown) onto a delivery tray (not shown), ending the image forming operation. A cleaning unit 30 cleans off toner left on the intermediate transfer member 28. Waste toner left after transferring four color toner images formed on the intermediate transfer member 28 to the print medium 11 is stored in a cleaner vessel. As described above, the tandem color LBP comprises the image forming units including the printing units 415 and scanner units 414 for the respective color components. In FIG. 2, regarding the scanner units 414, scanner units 414Y, 414M, 414C and 414K are shown for respective color components. Regarding the printing units 415, only printing unit 415Y for yellow is exemplarily illustrated.

<Profile Characteristic of Scan Line>

The profile characteristic of an actual scan line 302 for each color in the image forming apparatus will be explained with reference to FIGS. 3A and 3B. In FIG. 3B, the scan line 302 represents an actual scan line which inclines or skews owing to the positional precision and eccentricity of the photosensitive body 22, and the positional precisions of the optical systems in the scanner units 414, that is, 414C, 414M, 414Y, and 414K shown in FIG. 2. The image forming apparatus has a different profile characteristic for each printing device (printing engine). In a color image forming apparatus, the profile characteristic is different between colors.

Figure 3A:
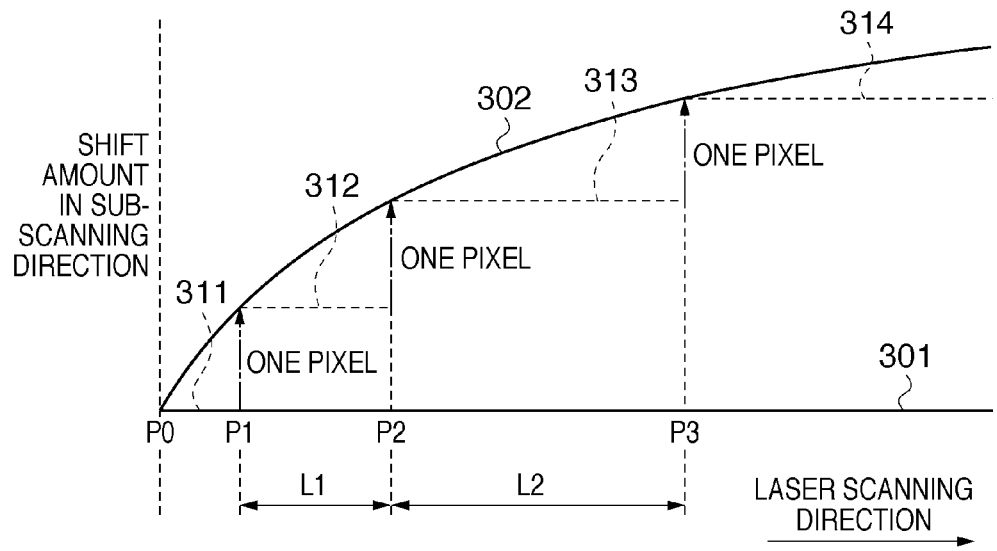
FIGS. 3A and 3B are graphs showing the profile characteristics of a scan line for each color in an image forming apparatus.
Figure 3B:
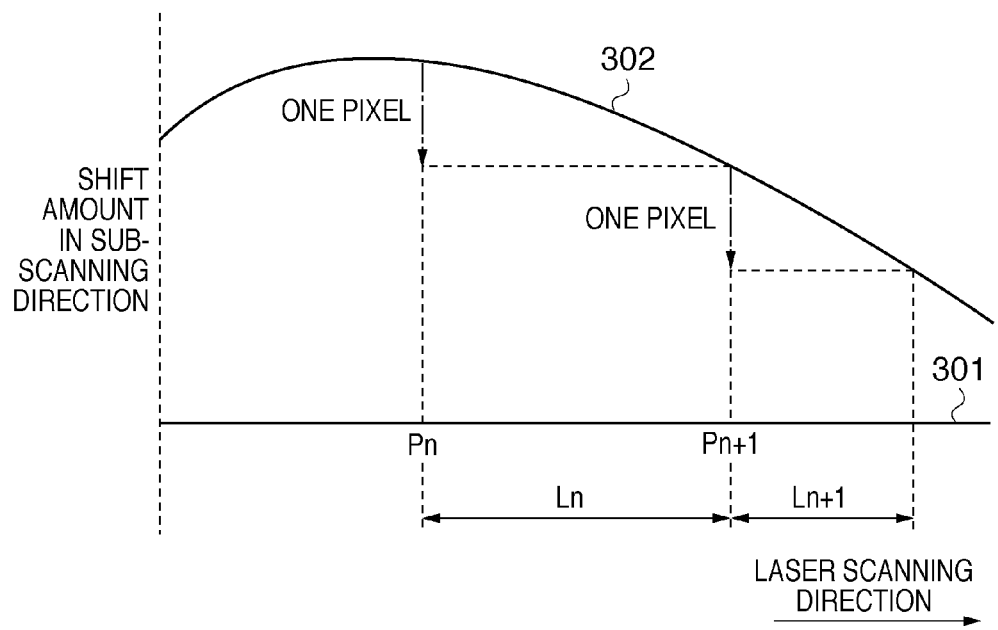

FIG. 3A is a graph showing part of the profile characteristic of the image forming apparatus, and shows an area where the profile characteristic shifts upward in the sub-scanning direction. FIG. 3B shows an area where the profile characteristic shifts downward in the sub-scanning direction. An abscissa axis 301 represents an ideal scan line, and shows a characteristic when the photosensitive body 22 is scanned perpendicularly to the rotational direction of the photosensitive body 22, that is, scanned parallel to the rotating shaft. The profile is expressed by a graph in FIGS. 3A and 3B, but a profile held in the profile information 416 is discrete data. For example, every time an actual scan line moves apart from or close to an ideal scan line by one pixel from a scan line start position P0, the position and the moving direction representing whether the actual scan line moves apart from or close to an ideal scan line are stored in association with each other. The position suffices to specify the ordinal number of a pixel in the scan line direction. Hence, the profile 302 is approximated by line segments 311, 312, 313, and 314 in profile information, which is sufficient for registration error correction.

In the following description, the profile characteristic assumes a direction in which the image processing section 402 corrects the profile characteristic. However, this representation is merely an example, and any representation can be adopted as long as the shift amount and direction can be uniquely specified. For example, it is possible to define the profile characteristic as the shift direction in the color image forming section 401 and correct the characteristic in the opposite direction by the image processing section 402.

Figure 7A:
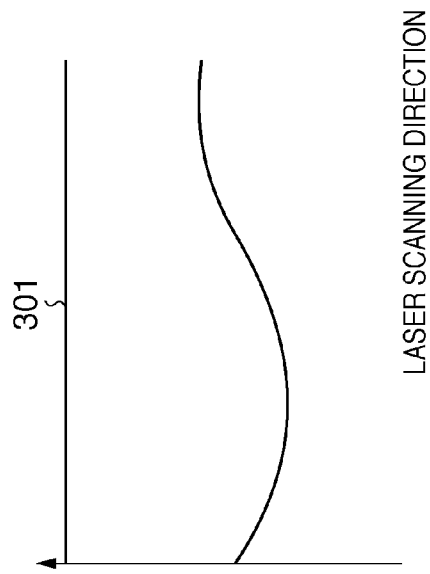
FIGS. 7A to 7D are graphs showing the correlation between the direction in which an image processing section 402 performs correction, and the shift direction in an image forming section 401 based on the profile definition.
Figure 7B:
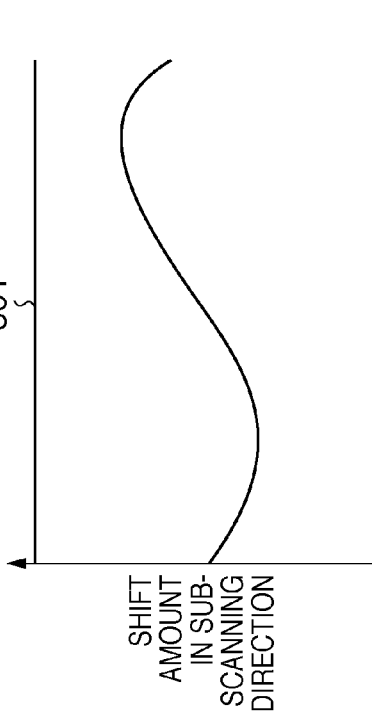
Figure 7C:
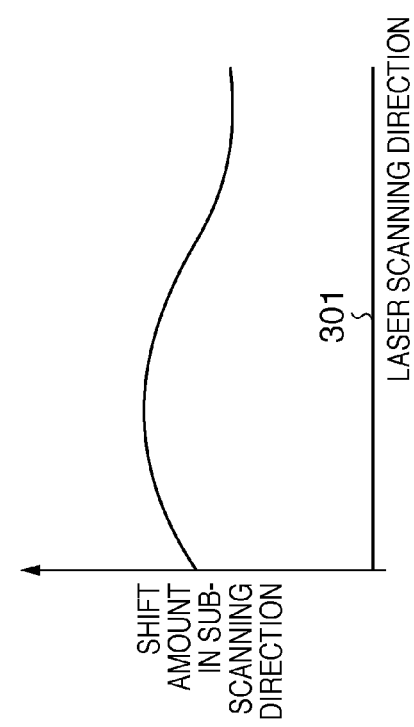
Figure 7D:
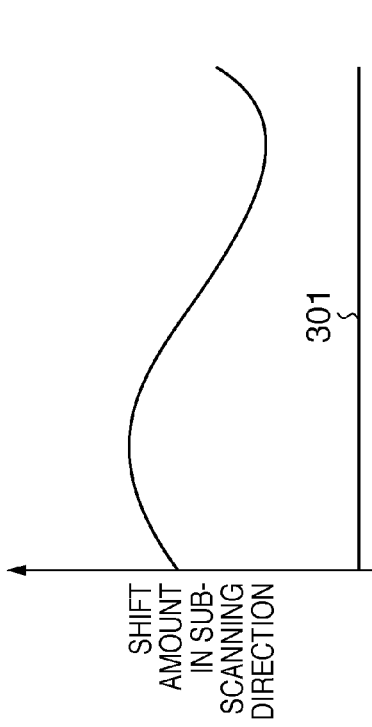

FIGS. 7A to 7D show the correlation between the direction in which the image processing section 402 performs correction, and the shift direction of the scan line in the color image forming section 401 based on the profile definition. When the profile characteristic of the color image forming section 401 is given as shown in FIG. 7A, the image processing section 402 shifts image data in an opposite direction in the sub-scanning direction, as shown in FIG. 7B. When the profile characteristic of the color image forming section 401 is given as shown in FIG. 7C, the image processing section 402 shifts image data in the sub-scanning direction, as shown in FIG. 7D. Note that the shift amount is measured using the ideal scan line 301 as a reference.

Profile characteristic data (profile information) includes the pixel position of a scan line changing point in the main scanning direction, and the direction of change of the scan line to the next scan line changing point, as shown in FIGS.

9A to 9C. More specifically, scan line changing points P1, P2, P3, . . . , Pm are defined for the profile characteristic in FIG. 9A. Each scan line changing point is defined as a point where the scan line shifts by one pixel in the sub-scanning direction. As the direction, the scan line shifts upward or downward in a section till the next scan line changing point. For example, at the scan line changing point P2, the scan line shifts upward by one line in FIG. 9A. That is, at the scan line changing point P2, image data changes to a line immediately below the current line. The shift direction at the point P2 is "upward (↑)", as shown in FIG. 9B. In the image process, image data changes to a lower line. Similarly at the point P3, the shift direction is "upward (↑)". The shift direction in the sub-scanning direction at the scan line changing point P4 is "downward (↓)", unlike the preceding direction. Data on the direction is held as, for example, "1" representing the upward direction, or "0" representing the downward direction, as shown in FIG. 9C. In this case, the amount of held data corresponds to bits equal in number to scan line changing points. If the number of scan line changing points is m, the number of held bits is also m.

<Scan Line Changing Point>

The scan line changing point of an area where the scan line shifts upward in the laser scanning direction will be explained with reference to FIG. 3A. The scan line changing point in the embodiment is a point where the scan line shifts by one pixel in the sub-scanning direction. In FIG. 3A, points P1, P2, and P3 where the upward skew characteristic 302 shifts by one pixel in the sub-scanning direction are scan line changing points. In FIG. 3A, the points P1, P2, and P3 are plotted using P0 as a reference. As is apparent from FIG. 3A, the distance between scan line changing points is short in an area where the skew characteristic 302 changes abruptly, and long in an area where it changes gradually, as represented by distances L1 and L2.

The scan line changing point of an area where the scan line shifts downward in the laser scanning direction will be explained with reference to FIG. 3B. Also in an area representing a downwardly shifted characteristic, the scan line changing point is defined as a point where the scan line shifts by one pixel in the sub-scanning direction. In FIG. 3B, points Pn and Pn+1 where the downward skew characteristic 302 shifts by one pixel in the sub-scanning direction are scan line changing points. Also in FIG. 3B, similar to FIG. 3A, the distance between scan line changing points is short in an area where the skew characteristic 302 changes abruptly, and long in an area where it changes gradually, as represented by distances Ln and Ln+1.

As described above, the scan line changing point is closely related to the degree of change of the skew characteristic 302 of the image forming apparatus. The number of scan line changing points is large in an image forming apparatus having a steep skew characteristic, and small in an image forming apparatus having a gradual skew characteristic.

If the skew characteristic of the image forming unit is different between colors, the number and positions of scan line changing points are also different. The difference in scan line profile between colors appears as a registration error in an image obtained by transferring toner images of all colors onto the intermediate transfer member 28. The present invention is directed to a process at the scan line changing point.

<Image Processing Section of Tandem Color LBP>

The image processing section 402 in the color image forming apparatus will be explained with reference to FIG. 4. An image generation unit 404 generates raster image data capable of a printing process from print data received from a computer or the like (not shown), and outputs the raster image data for each pixel as R, G, and B data and attribute data representing the data attribute of each pixel. The image generation unit 404 may also be configured to arrange a reading means in the color image forming apparatus and process image data from the reading means instead of image data received from a computer or the like. A color conversion unit 405 converts R, G, and B data into C, M, Y, and K data in accordance with the toner colors of the color image forming section 401, and stores the C, M, Y, and K data and attribute data in a storage unit 406. The storage unit 406 is the first storage unit arranged in the image processing section 402, and temporarily stores dot image data subjected to a printing process. The storage unit 406 may also be formed from a page memory which stores dot image data of one page, or a band memory which stores data of lines. Dot image data is also called raster image data.

Halftone processing units 407C, 407M, 407Y, and 407K perform a halftone process for attribute data and data of the respective colors output from the storage unit 406. As concrete arrangements of the halftone processing unit, there are a halftone processing unit which performs a screen process, and a halftone processing unit which performs an error diffusion process. The screen process is to perform an N-ary process using predetermined dither matrices and input image data. The error diffusion process is to perform an N-ary process by comparing input image data with a predetermined threshold, and diffuse the difference between the input image data and the threshold to peripheral pixels subjected to the N-ary process later. The first embodiment executes the screen process. In the first embodiment, N=2, but the number of bits of one pixel is four. That is, a pixel value is converted into 0 or 15 by a quantization process.

A second storage unit 408 is incorporated in the image forming apparatus, and stores N-ary data processed by the halftone processing units 407, that is, 407C, 407M, 407Y, and 407K. If the position of a pixel subjected to an image process by processing blocks on the downstream side of the second storage unit 408 is a scan line changing point, scan line changing of one line is executed when reading out data from the second storage unit 408. More specifically, the address of a dot to be read out proceeds not to the next dot but further by one line from the next dot, or returns by one line. Whether to proceed or return the address by one line is determined in accordance with the shift direction.

Figure 8A:
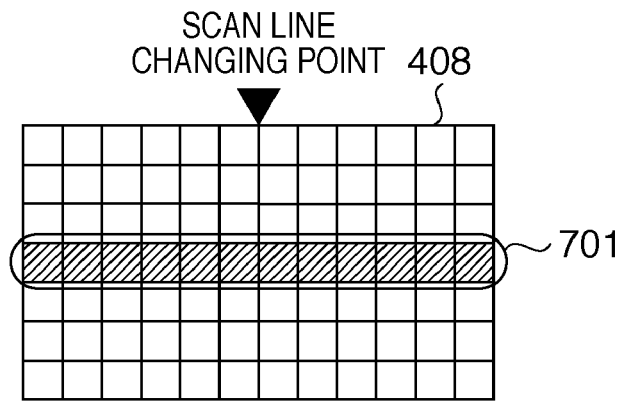
FIGS. 8A to 8C are views schematically showing the state of data held in a storage unit 408.
Figure 8B:
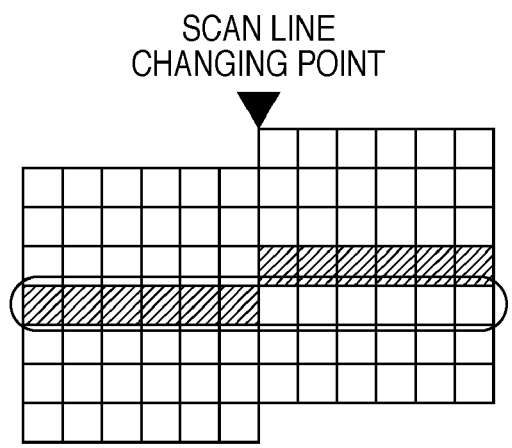
Figure 8C:
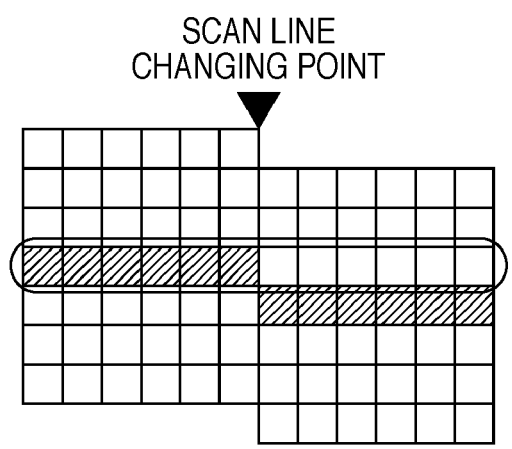

FIG. 8A is a view schematically showing the state of data held in the storage unit 408 of FIG. 4. As shown in FIG. 8A, the storage unit 408 stores data processed by the halftone processing unit 407 regardless of the correction direction of the image processing section 402 or the skew characteristic of the scan line in the color image forming section 401. If the direction in which the image processing section 402 performs correction is downward, that is, the profile characteristic is downward, image data is shifted upward by one pixel at a scan line changing point serving as a boundary, as shown in FIG. 8B, when reading out a line 701 in FIG. 8A. If the direction in which the image processing section 402 performs correction is upward, that is, the profile characteristic is upward, image data is shifted downward by one pixel at a scan line changing point serving as a boundary, as shown in FIG. 8C, when reading out image data of the line 701 from the storage unit 408.

Interpolation determining units 409C, 409M, 409Y, and 409K for the respective colors determine whether or not the pixel requires interpolation later as a process for pixels before and after a scan line changing point in input N-ary data. Timing adjusting units 410C, 410M, 410Y, and 410K synchronize N-ary data read out from the storage unit 408 with the determination results of the interpolation determining units 409. Transfer buffers 411C, 411M, 411Y, and 411K temporarily hold data output from the interpolation determining units 409 and timing adjusting units 410. In this description, the first storage unit 406, second storage unit 408, and transfer buffer 411 are separately arranged, but a common storage unit may also be arranged in the image forming apparatus.

Interpolation processing units 412C, 412M, 412Y, and 412K interpolate data received from the transfer buffers 411 based on the determination results of the interpolation determining units 409 that are also transferred from the transfer buffers. Although the determination result from the interpolation determining unit 409 is the result of determination of each pixel, the interpolation process by the interpolation processing unit 412 uses pixels before and after a scan line changing point corresponding to the profile (skew characteristic) of the image forming apparatus. FIGS. 5A to 5G show an interpolation method at a scan line changing point (FIGS. 5A to 5G will be referred to as FIG. 5 at once).

<Interpolation Process>

Figure 5A:
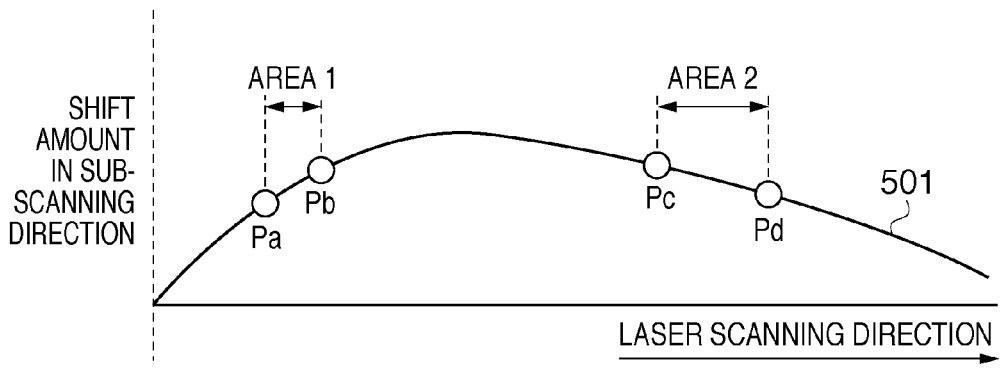

FIG. 5A is a graph showing a skew characteristic 501 of the scan line of the image forming apparatus in the laser scanning direction. Area 1 is an area where the image processing section 402 needs to perform correction downward. To the contrary, area 2 is an area where the image processing section 402 needs to perform correction upward. For descriptive convenience, the minimum interval between scan line changing points is 16 pixels in the following description of the interpolation process, but the present invention is not limited to this. The interval may also be set to an arbitrary number of pixels, or the power of two in order to reduce the circuit arrangement. Interpolation, that is, smoothing to be described later is done for 16 pixels immediately before a scan line changing point in the main scanning direction. If the interval between scan line changing points is longer than 16 pixels, pixels preceding to (on the left side in FIG. 5A) the smoothed area remain without being smoothed. The interval is set to 16 pixels because one binary pixel is represented by four bits in this example and can also be represented by 16 tone levels in accordance with the tone expression capability of the image forming unit. A step between lines can be smoothed by changing the density by one tone level for one pixel value.

Figure 5B:
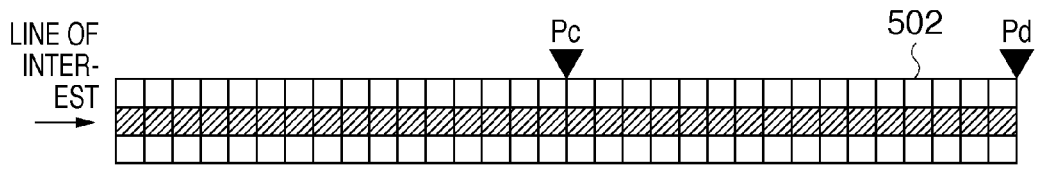
Figure 5C:
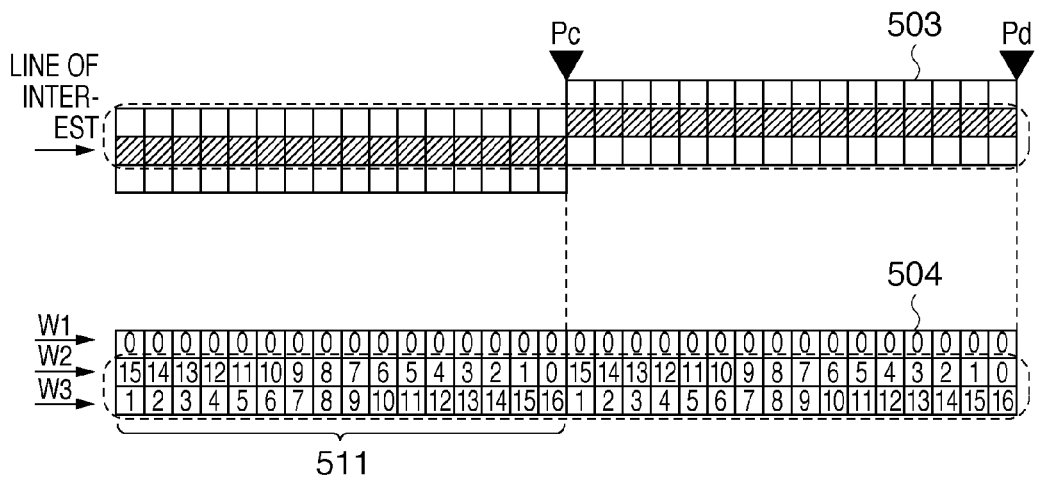

FIG. 5B shows images before and after a scan line changing point Pc before the scan line changing process, that is, shows output image data 502 from the halftone processing unit 407 in the example of FIG. 5A. The line of interest is the center line of 3-line image data shown in FIG. 5B. FIG. 5C shows the arrangement of data 503 after the scan line changing process of one pixel when paying attention to the line of interest, that is, the arrangement of image data output from the storage unit 408. Since the scan line changing process is performed when reading out image data from the storage unit 408, the arrangement of pixels before and after the scan line changing point Pc when inputting image data to the interpolation processing unit 412 has a step of one line at the scan line changing point Pc serving as a boundary.

The interpolation processing unit 412 executes the interpolation process for image data appearing as a step on the line of interest. Since the correction direction in area 1 is upward, the line of interest is interpolated by weighting image data of a succeeding line. Weighting in this description is to adjust the sum of two target pixels in the sub-scanning direction to 16 in accordance with the minimum value of the scan line changing point, as represented on the lower stage of FIG. 5C. However, this is merely an example, and the sum of pixel values is not limited to 16. The sum of pixel values may also be set to the power of two in order to reduce the circuit used for calculation, or an arbitrary coefficient may also be used for calculation in order to increase the precision. As the weighting calculation, the weighting coefficient may also be changed for each pixel, which will be described later. Alternatively, a common weighting coefficient may also be used for a plurality of pixels, as shown in FIGS. 16A to 16D. Further, the number of corresponding pixels may also be changed depending on the value of the weighting coefficient. The scan line changing point is defined as a position on the main scan line where the scan line shifts by one pixel in the sub-scanning direction. In the following description, the reference position in interpolation is set to the start point of main scanning, that is, the left end. Equation (1) is used for interpolation, wherein x represents the position of the pixel of interest in the main scanning direction, and y represents the position of the pixel of interest in the sub-scanning direction. Letting p be a pixel value and p' be a pixel value after correction, equation (1) is $$p'(x,y) = w1 \times p(x,y-1) + w2 \times p(x,y) + w3 \times p(x,y+1) \tag{1}$$

where w1, w2, and w3 are weighting coefficients having the same x-coordinate and are defined by a coefficient matrix 504 of 3×16 pixels in this example, as shown in FIG. 5C. The coefficient matrix 504 in FIG. 5C is used to shift image data to an upper line at a scan line changing point. All coefficients on a line immediately above the line of interest are 0. The coefficient value on the line of interest (center line in FIG. 5C) is decremented by 1/16 from 15/16 to 0/16 (the denominator is not shown in FIG. 5C) every time the pixel of interest moves to the right by one pixel. The coefficient value on a line immediately below the line of interest is incremented by 1/16 from 1/16 to 16/16 every time the pixel of interest moves to the right by one pixel. This coefficient matrix corresponds to 3×16 pixels centered on the line of interest immediately before (on the right side) the scan line changing point, and corrected pixel values are obtained in accordance with equation (1). The corrected pixel values replace pixel values before correction. This process is done by paying attention to all lines of image data to be processed. Equation (1) represents the value of the pixel of interest by the weighted average of the value of the pixel of interest and the values of corresponding pixels on upper and lower lines.

Figure 5D:
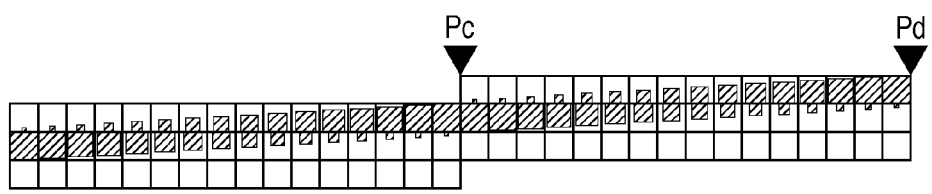
Figure 6A:
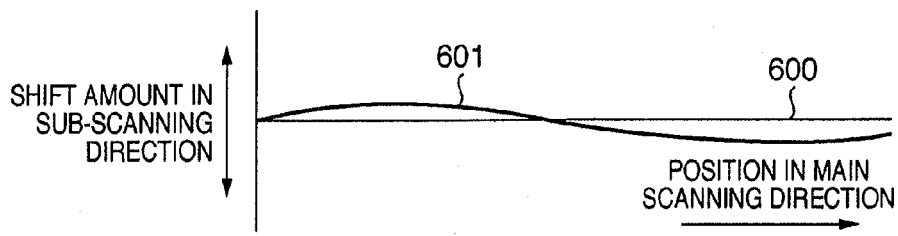
FIGS. 6A to 6D are graphs showing examples of the skew profile of a scan line.
Figure 6B:
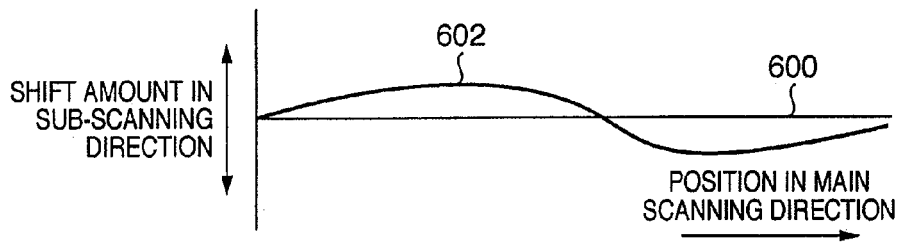
Figure 6C:
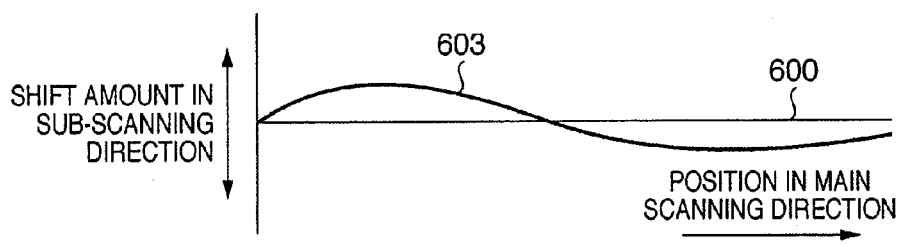
Figure 6D:
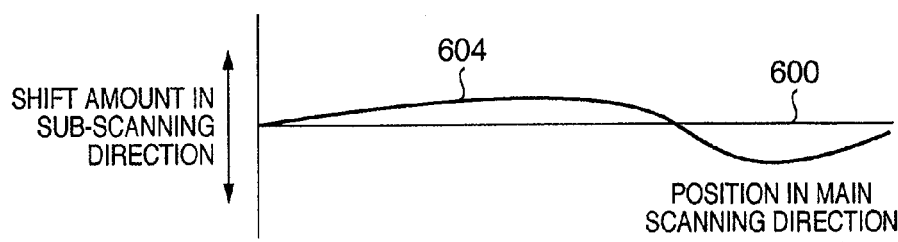

FIG. 5D is a conceptual view of interpolated pixel values obtained by applying equation (1) to the image data 502 in FIG. 5B. As for pixels before the scan line changing point Pc, as the pixel is closer to the scan line changing point Pc, it is more strongly influenced by a pixel value on a succeeding line by the interpolation of equation (1). As the pixel (pixel on the left side) is farther from the scan line changing point Pc, it is more strongly influenced by the line of interest, that is, black data line.

As for pixels after the scan line changing point Pc, as the pixel is closer to the scan line changing point Pc, it is more strongly influenced by image data on a line preceding to the line of interest. As the pixel is farther from the scan line changing point Pc, it is more strongly influenced by a line succeeding to the line of interest. The line preceding to the line of interest is a previous line of interest which becomes a preceding line of data owing to a scan line changing process of larger than one pixel. In this example, pixels other than 16 pixels immediately before the scan line changing point do not undergo the interpolation process, so their image data are not smoothed.

Area 2 where correction needs to be performed downward will be explained. When performing correction downward, weighting coefficients used to calculate corrected pixel values are set on the line of interest and a line preceding to it.

FIG. 5E shows image data output from the halftone processing unit 407. FIG. 5F shows an example of image data read out from the storage unit 408. Since downward correction is done at a scan line changing point Pa, a scan line changing process step larger than one pixel appears at the scan line changing point Pa serving as a boundary, as shown in FIG. 5F. The values W1, W2, and W3 when performing downward correction are those shown on the lower stage of FIG. 5F. For descriptive convenience, the sum of weighting coefficients is set to 16, similar to the upward correction process. By applying equation (1) to even downward correction, corrected pixel values are obtained using the scan line changing point Pa as a boundary. Before the scan line changing point Pa, as the pixel is closer to the scan line changing point, it is more strongly influenced by a pixel value on a preceding line. As the pixel is farther from the scan line changing point Pa, it is more strongly influenced by the line of interest. As for pixels after the scan line changing point Pa, as the pixel is closer to the scan line changing point Pa, it is more strongly influenced by the line of interest. As the pixel is farther from the scan line changing point Pa, it is more strongly influenced by a line preceding to the line of interest (FIG. 5G). In this example, the interpolation process targets 16 pixels before the scan line changing point. In FIG. 5G, the interval between the scan line changing points Pa and Pb is 16 pixels, so image data seem to be smoothed before and after the scan line changing point Pa. However, when the interval is larger than 16 pixels, image data are not smoothed immediately after the scan line changing point Pa.

In this way, a large step is prevented from appearing in pixel data successive in the main scanning direction owing to a scan line changing process step larger than one pixel in the interpolation process by the interpolation processing unit 412 regardless of whether the correction direction is upward or downward.

PWMs (Pulse Width Modulators) 413C, 413M, 413Y, and 413K convert image data of the respective colors output from the interpolation processing units 412C, 412M, 412Y, and 412K into the exposure times of the scanner units 414C, 414M, 414Y, and 414K. The printing units 415C, 415M, 415Y, and 415K of the image forming section 401 output the converted image data. Profile characteristic data described with reference to FIGS. 9A to 9C are held in the image forming section 401 as the characteristics of the image forming apparatus (the profiles 416C, 416M, 416Y, and 416K). The image processing section 402 executes a scan line changing process and interpolation process in accordance with the profile characteristics held in the image forming section 401.

<Interpolation Determination Process>

The most characteristic part of the present invention will be described with reference to FIG. 10 and the like. The embodiment of the present invention is characterized by a technique of determining an image attribute (performing attribute determination) for each color plane to determine whether or not to perform the interpolation process, that is, performing interpolation determination and correcting interpolation determination results in consideration of all color planes. An example of a system for implementing this technique is a system shown in the flowchart of FIG. 10 and the block diagram of FIG. 12.

Figure 12:
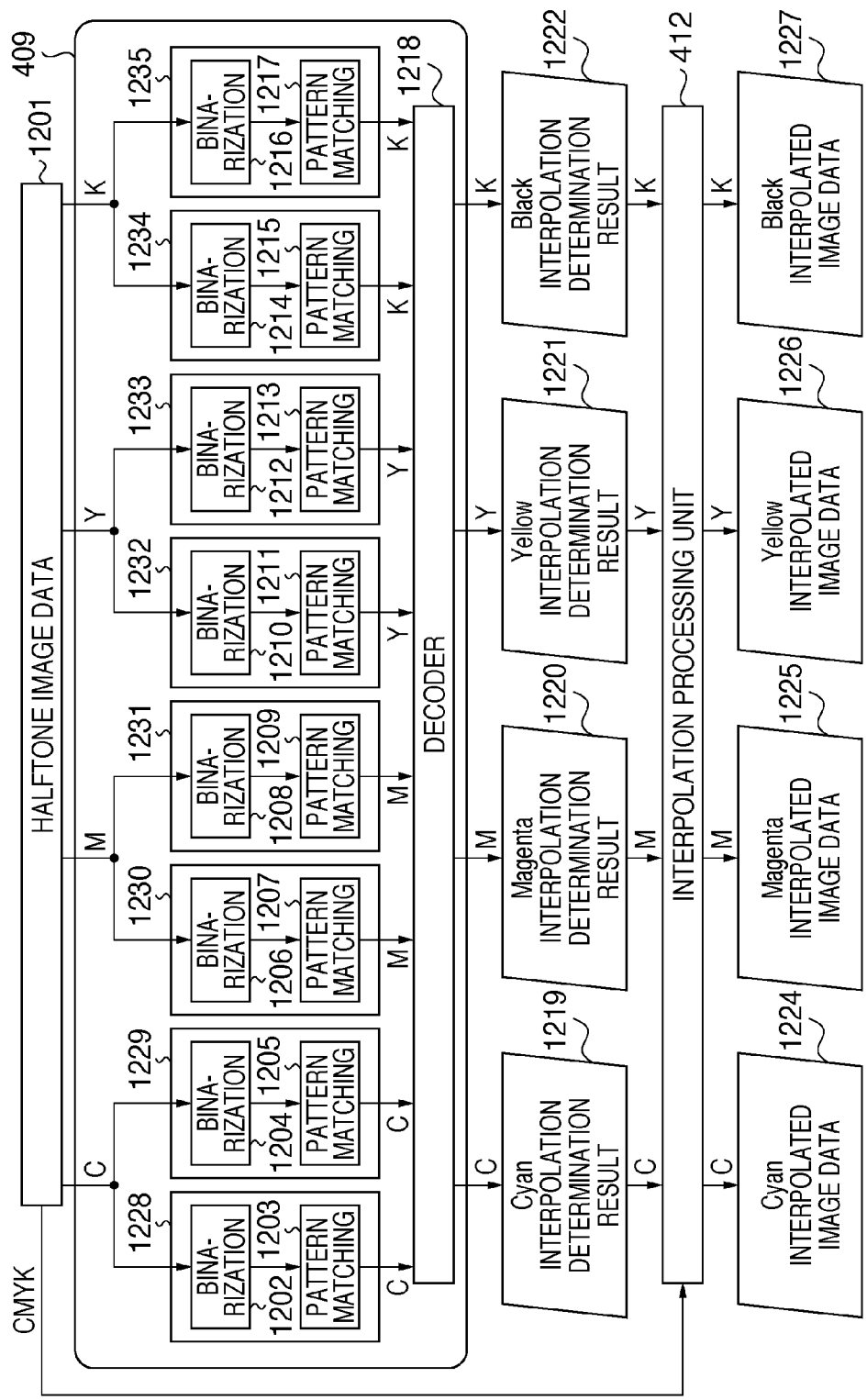
FIG. 12 is a block diagram for explaining the main process according to the first embodiment.

FIG. 10 is a flowchart for explaining a process by the interpolation processing unit 412. FIG. 12 is a block diagram of a detailed process of the interpolation determining unit 409. An interpolation determining unit shown in FIG. 12 executes the sequence in FIG. 10. The interpolation determining units 409C, 409M, 409Y, and 409K in FIG. 4 are represented as the interpolation determining unit 409 in FIG. 12 in the first embodiment. Details of determination of images of respective color components, the interpolation determination process, and the interpolation process will be described with reference to these drawings. The following description uses a continuous tone image as an example of an image attribute for which no interpolation process should be performed, and a pattern image as an example of an image attribute for which interpolation should be performed. Determining units for these two image attributes are arranged for each color component. "Interpolation OFF" is determined for an image for which no interpolation process should be performed, and "interpolation ON" is determined for an image for which the interpolation process should be performed.

In step S1001 of FIG. 10, the cyan component (cyan plane) of input halftone image data 1201 is transmitted to a continuous tone image determination processing unit 1228 and pattern image determination processing unit 1229, and the process advances to step S1002. The continuous tone image determination processing unit will also be called a continuous tone image determining unit, and the pattern image determination processing unit will also be called a pattern image determining unit.

In step S1002, the continuous tone image determination processing unit 1228 performs binarization 1202, and then pattern matching 1203 with the screen pattern of the cyan plane registered in advance, obtaining the determination result. When the cyan plane matches the cyan screen pattern, the continuous tone image determination processing unit 1228 transmits, to a decoder 1218, the determination result that the continuous tone image determination flag is ON. After that, the process advances to step S1003. Note that the screen pattern is determined by a dither matrix used in the screen process. Since the screen process is generally done using a dither matrix defined in advance, the screen pattern can be obtained in advance. The screen pattern can also be stored as a screen angle. For example, the edge of a screen angle stored in advance is extracted from a binary image, and the area where the extracted edge is distributed is the area of a continuous tone image, that is, a continuous tone image object. Edge extraction of a predetermined screen angle can be done by a filtering process. For example, if the area of an extracted continuous tone image object exceeds 50% of the entire image, it is determined that the image is a continuous tone image. The image may also be divided into areas for respective image object types. In the first embodiment, for simplicity of the process and a descriptive convenience, the type of entire image is determined. The process to determine the image type is also called an image attribute determination process. In the first embodiment, image data after the screen process is data quantized into 4 bits/pixel whose tone can be expressed by the pulse width of a laser beam by the image forming unit. Thus, the image data is converted into 1 bit/pixel by the binarization process.

In step S1003, the pattern image determination processing unit 1229 performs binarization 1204, and then pattern matching 1205 with a pattern image registered in advance. If the cyan plane matches the pattern of the pattern image, the pattern image determination processing unit 1229 transmits, to the decoder, the result that the pattern image determination flag is ON.

In steps S1004 to S1009, the same processes as those in steps S1002 and S1003 are executed for the remaining color planes.

After the determination results of all the color planes are output, two determination results, that is, a continuous tone image determination result and pattern image determination result are input to the decoder 1218 in step S1010. The decoder 1218 outputs an interpolation determination result based on the input determination results of each color component by looking up a decoder lookup table (to be referred to as a decoder LUT hereinafter) in FIG. 13. In FIG. 13, the interpolation determination is OFF when the continuous tone image determination result is ON, and ON when the continuous tone image determination result is OFF. However, when the continuous tone image determination result is ON and the pattern determination result is ON, the interpolation determination is a provisional value and is not finalized.

Assume that determination results as shown in FIG. 14 are obtained. In this example, the determination results of magenta, yellow, and black are "continuous tone image flag OFF" and "pattern image determination ON", and interpolation determination "ON" is finalized from the decoder LUT. However, the determination result of cyan is "continuous tone image flag ON" and "pattern image determination ON", and interpolation determination is OFF in the decoder LUT. This result is different from those of the remaining color planes.

In step S1011, it is determined whether the pattern image determination result (pattern image determination result flag) is ON for all the color planes of the target pixel. If the pattern image determination result is ON for all the color planes, the process advances to step S1012. If the pattern image determination result is OFF for even one color plane, the process advances to step S1015.

In step S1012, it is determined whether the interpolation determination results of the images of all the color components coincide with each other. If these determination results coincide with each other, the process advances to step S1015. If there is a different determination result, the process advances to step S1013. In the above-described example, there is a color plane having a different determination result, so the process advances to step S1013.

In step S1013, it is determined whether there is a color plane having the continuous tone image determination flag "ON". If there is a color plane having the continuous tone image determination flag "ON", the screen pattern of the color plane matches the pattern of the registered pattern image, and the interpolation determination result of this color plane has not been finalized yet. In this example, this color plane is a cyan plane. If there is a color plane having the continuous tone image determination flag "ON" (YES in step S1013), the process advances to step S1014; if NO, to step S1015.

In step S1014, the interpolation determination result of the remaining color planes is applied to that of a color plane whose interpolation determination result has not been finalized, that is, whose continuous tone image determination flag is determined in S1013 to be ON. In this example, the unfinalized interpolation determination result of cyan is overwritten with the finalized determination result "interpolation determination ON" of magenta, yellow, and black. That is, all the color planes have the interpolation determination result "interpolation determination ON". Subsequently, the process advances to step S1015.

In step S1015, interpolation determination results 1219, 1220, 1221, and 1222 of the respective colors are output. Then, the process advances to step S1016.

In step S1016, the interpolation processing unit 412 executes the interpolation process for the halftone image data 1201 based on the obtained interpolation determination results 1219, 1220, 1221, and 1222. If the interpolation determination result is ON, the interpolation processing unit 412 of each color component executes the interpolation process. The interpolation processing unit 412 outputs interpolated image data 1224, 1225, 1226, and 1227 of the respective color planes, and the process ends.

Figure 1B:
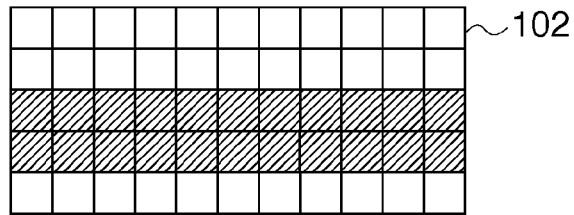
Figure 1C:
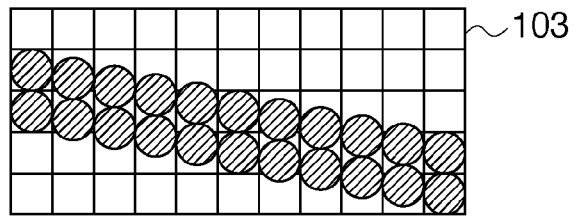
Figure 1D:
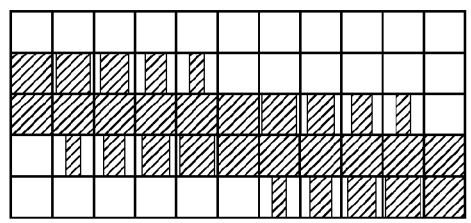
Figure 1E:
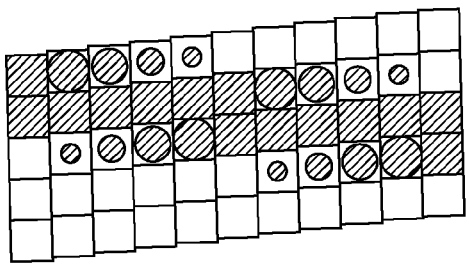
Figure 15A:
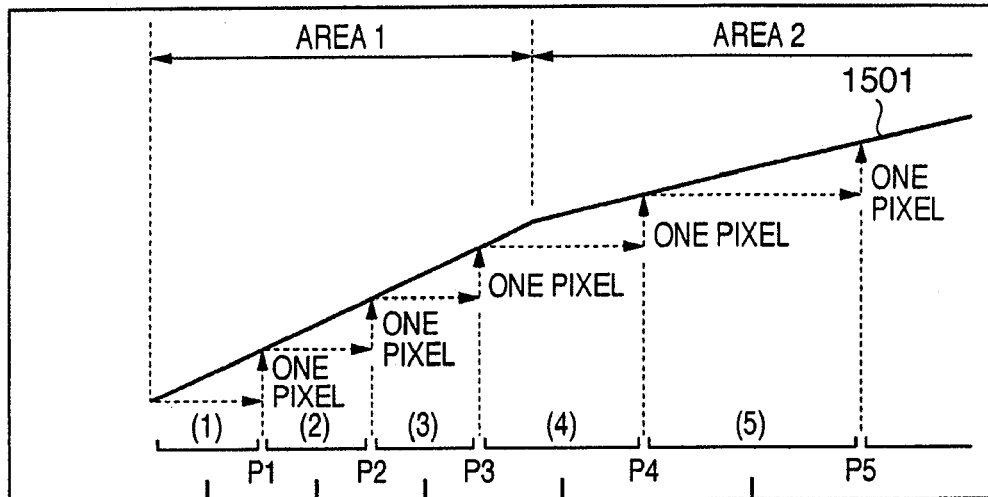
FIGS. 15A to 15C are views for explaining a correction method for less than one pixel.
Figure 15B:
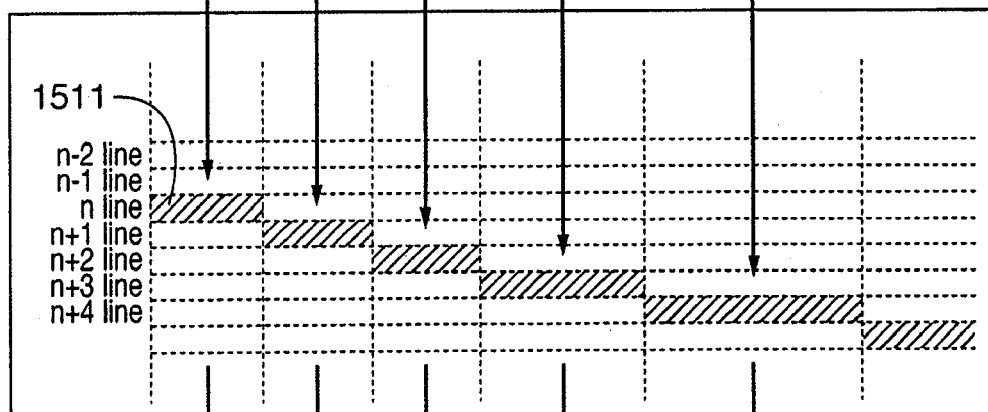
Figure 15C:
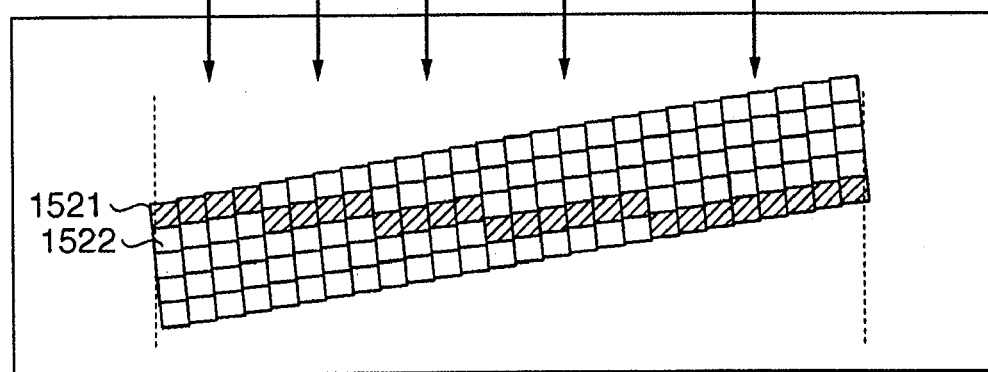

FIGS. 1A to 1E show an example of the interpolation process. As exemplified in FIGS. 1A to 1E, the tone value of bitmap image data is adjusted using preceding and succeeding pixels in the shift direction, and thereby corrected. When the characteristic represents an upward inclination as shown in FIG. 1A, like a profile 101, bitmap image data before tone correction is corrected to a pixel array 103 (shown in FIG. 1C) inclined (downward in this example) in a direction opposite to the inclination of the profile. FIG. 1B shows bitmap image data before correction. Image data 102 is shifted in the sub-scanning direction for each pixel at the scan line changing point P1 and the like, as shown in FIGS. 15A to 15C. To make the shifted image data close to the ideal corrected image data 103, tone correction is executed as shown in FIG. 1D to smooth a step at the scan line changing point P. FIG. 1D is a view schematically showing the densities of respective pixels by the width and intensity of a laser pulse for forming these pixels. After exposure, a latent image as shown in FIG. 1E is formed, smoothing a step generated by the scan line changing process.

In this way, an unfinalized interpolation determination result derived from an indefinite attribute determination result is overwritten with a finalized interpolation determination result derived from a definite attribute determination result. An appropriate interpolation process can be applied to image data of an attribute for which the same interpolation should be applied to all color planes. As a result, an image defect such as color moiré can be avoided.

This process is applied to an image (or an image object) formed from a plurality of color components. Hence, this process is not always applied to a color image in which images of different attributes are formed by respective color components. For example, whether or not to perform the interpolation process can also be different between the color planes of an image formed from a pattern image of a given primary color and a continuous tone image of another primary color. This is because moiré or a stripe is hardly generated depending on whether or not to perform the interpolation process.

In the first embodiment, the continuous tone image determination processing unit is used as a circuit for determining an image for which no interpolation process should be performed, and the pattern image determining unit is used as a circuit for determining an image for which the interpolation process should be performed. However, a combination of attributes determined by the determining units is not limited to this. The present invention is applicable to a system in which modules for outputting an interpolation ON determination flag and interpolation OFF determination flag are compatible and an indefinite result may be obtained from either module. Needless to say, the present invention is also applicable to a system having two or more types of determining units.

The first embodiment has exemplified pattern matching as an attribute determining means, but the attribute may also be determined by another method.

The first embodiment has described two interpolation methods "interpolation ON" and "interpolation OFF", but it can also be set to change the level of the interpolation process depending on the attribute. The level of the interpolation process is, for example, the tone level when smoothing data at tone levels smaller or larger in number than 16 tone levels at which data is smoothed in the first embodiment.

[Second Embodiment]

As the second embodiment, the following arrangement may also be employed. More specifically, when the attribute determination flag "ON" is output for all color planes from determining units for an attribute for which all color planes should have the same interpolation determination result, like a pattern image in the first embodiment, interpolation determination is made by referring to only this result while ignoring the determination result of another attribute.

This will be explained with reference to FIG. 12. Assume that all pattern image determining units 1229, 1231, 1233, and 1235 obtain the result that the pattern image determination flag is ON. In this case, interpolation determination may also be made without referring to the results of continuous tone image determining units 1228, 1230, 1232, and 1234. This is because, if the input image is determined to be a pattern image for all color planes, all the color planes include pattern images, so the same interpolation method (interpolation ON in this case) should be selected for all the color planes. This arrangement can execute interpolation determination within a short time without using an unnecessary determining unit.

[Other Embodiments]

The present invention may also be applied to a system including a plurality of devices (e.g., a host computer, interface device, reader, and printer), or an apparatus (e.g., a copying machine or facsimile apparatus) formed by a single device. The object of the present invention is also achieved by supplying a storage medium which stores program codes for implementing the functions of the above-described embodiments to a system or apparatus, and reading out and executing the program codes stored in the storage medium by the computer of the system or apparatus. In this case, the program codes read out from the storage medium implement the functions of the above-described embodiments, and the storage medium which stores the program codes constitutes the present invention.

The present invention also includes a case where an OS (Operating System) or the like running on the computer performs part or all of actual processing based on the instructions of the program codes and thereby implements the functions of the above-described embodiments. Further, the present invention is also applied to a case where the program codes read out from the storage medium are written in the memory of a function expansion card inserted into the computer or the memory of a function expansion unit connected to the computer. In this case, the CPU or the like of the function expansion card or function expansion unit performs part or all of actual processing based on the instructions of the program codes, and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-199897, filed Jul. 31, 2007, which is hereby incorporated by reference herein in its entirety.

What is claimed is:

1. A color image forming apparatus which has, for each color component, an image forming unit for forming an image, and which forms a color image by compositing images of respective color components, the apparatus comprising:

a scan line changing processing unit configured to shift a position of each pixel in a sub-scanning direction for each color component of dot image data to be processed, so as to offset a shift amount of a scan line in the sub-scanning direction on an image carrier of the image forming unit;

a type determining unit configured to determine an image type for each color component of the image data to be processed;

an interpolation determining unit configured to determine, based on the image type determined by the type determining unit for each color component, whether to perform an interpolation process to smooth a step of one pixel generated by shifting the dot image data by the scan line changing processing unit; and a changing unit configured to, when the image type is common to the respective color components and interpolation determination results are different between the respective color components, changing the interpolation determination results to make the interpolation determination results of all the color components coincide with each other, wherein the type determining unit includes pattern image determining unit for determining whether an image to be processed is a pattern image including a repetitive pattern, and a continuous tone image determining unit for determining whether the image to be processed is a continuous tone image having a continuous tone, wherein the interpolation determining unit determines not to perform the interpolation process when the type determining unit determines that the image data to be processed represents a continuous tone image, and to perform the interpolation process when the type determining unit determines that the image data to be processed does not represent a continuous tone image, and when the type determining unit determines that images of all the color components to be processed are pattern images, interpolation determination results obtained by the interpolation determining unit for all the color components do not coincide with each other, and a color component determined by the type determining unit to be a continuous tone image exists, the changing unit changes an interpolation determination result for the color component to an interpolation determination result of remaining color components.

2. A color image forming apparatus which has, for each color component, an image forming unit for forming an image, and which forms a color image by compositing images of respective color components, the apparatus comprising:

a scan line changing processing unit configured to shift a position of each pixel in a sub-scanning direction for each color component of image data corresponding to the color image to be processed, so as to offset a shift amount of a scan line in the sub-scanning direction on an image carrier of the image forming unit;

a first type determining unit configured to determine whether an image type for each color component of the image data to be processed is a first image type;

a second type determining unit configured to determine whether an image type for each color component of the image data to be processed is a second image type;

an interpolation determining unit configured to determine for the respective color components as interpolation determination results, based on a combination of determination results by the first type determining unit and the second type determining unit for each color component, whether to perform an interpolation process to smooth a step of one pixel generated by shifting each color component of the image data by the scan line changing processing unit, the interpolation determination results including finalized and unfinalized interpolation determination results;

a changing unit configured to, in a case where the interpolation determination results are different between the respective color components, change the interpolation determination results to make the interpolation determination results of all the color components corresponding to the color image coincide with each other by overwriting unfinalized interpolation determination results with finalized interpolation determination results; and an interpolation processing unit configured to execute the interpolation process based on the interpolation determination results changed by the changing unit.

3. The apparatus according to claim 2, wherein when the first type determining unit determines that images of all the color components of the image data to be processed have the first image type, and the interpolation determination results of the images of all the color components include a different result, the changing unit unifies the interpolation determination results so as to perform the interpolation process for the images of all the color components.

4. The apparatus according to claim 2, wherein when the first type determining unit determines that images of all the color components of the image data to be processed have the first image type, the changing unit unifies the interpolation determination results of the images of all the color components into an interpolation determination result corresponding to the first image type.

5. The apparatus according to claim 2, wherein the interpolation determining unit determines a level of the interpolation process instead of determining whether to perform the interpolation process.

6. A method for a color image forming apparatus which has, for each color component, an image forming unit for forming an image, and which forms a color image by compositing images of respective color components, the method comprising the steps of:

shifting a position of each pixel in a sub-scanning direction for each color component of image data corresponding to the color image to be processed, so as to offset a shift amount of a scan line in the sub-scanning direction on an image carrier of the image forming unit;

determining whether an image type for each color component of the image data to be processed is a first image type, so as to obtain a first determination result;

determining whether an image type for each color component of the image data to be processed is a second image type, so as to obtain a second determination result;

determining for the respective color components as interpolation determination results, based on a combination of the first and second determination results for each color component, whether to perform an interpolation process to smooth a step of one pixel generated by shifting each color component of the image data in the shifting step, the interpolation determination results including finalized and unfinalized interpolation determination results;

in a case where the interpolation determination results are different between the respective color components, changing the interpolation determination results to make the interpolation determination results of all the color components corresponding to the color image coincide with each other by overwriting unfinalized interpolation determination results with finalized interpolation determination results; and executing the interpolation process based on the interpolation determination results changed in the changing step.

7. The method according to claim 6, wherein in a case where it is determined that images of all the color components of the image data to be processed have the first image type, and that the interpolation determination results of the images of all the color components include a different result, unifying the interpolation determination results so as to perform the interpolation process for the images of all the color components.

8. The apparatus according to claim 6, wherein in a case where it is determined that images of all the color components of the image data to be processed have the first image type, unifying the interpolation determination results of the images of all the color components into an interpolation determination result corresponding to the first image type.

9. The apparatus according to claim 6, wherein a level of the interpolation process is determined instead of determining whether to perform the interpolation process.

10. A non-transitory computer-readable storage medium storing computer-executable instructions which cause a computer to execute a method for a color image forming apparatus which has, for each color component, an image forming unit for forming an image, and which forms a color image by compositing images of respective color components, the method comprising the steps of:

shifting a position of each pixel in a sub-scanning direction for each color component of image data corresponding to the color image to be processed, so as to offset a shift amount of a scan line in the sub-scanning direction on an image carrier of the image forming unit;

determining whether an image type for each color component of the image data to be processed is a first image type, so as to obtain a first determination result;

determining whether an image type for each color component of the image data to be processed is a second image type, so as to obtain a second determination result;

determining for the respective color components as interpolation determination results, based on a combination of the first and second determination results for each color component, whether to perform an interpolation process to smooth a step of one pixel generated by shifting each color component of the image data in the shifting step, the interpolation determination results including finalized and unfinalized interpolation determination results;

in a case where the interpolation determination results are different between the respective color components, changing the interpolation determination results to make the interpolation determination results of all the color components corresponding to the color image coincide with each other by overwriting unfinalized interpolation determination results with finalized interpolation determination results; and executing the interpolation process based on the interpolation determination results changed in the changing step.

* * * * *